Dec. 4, 1962  R. STRUB  3,067,135
BEARING COMPRISING POLYTETRAFLUOROETHYLENE AND PHOSPHATE GLASS
Filed Feb. 29, 1960
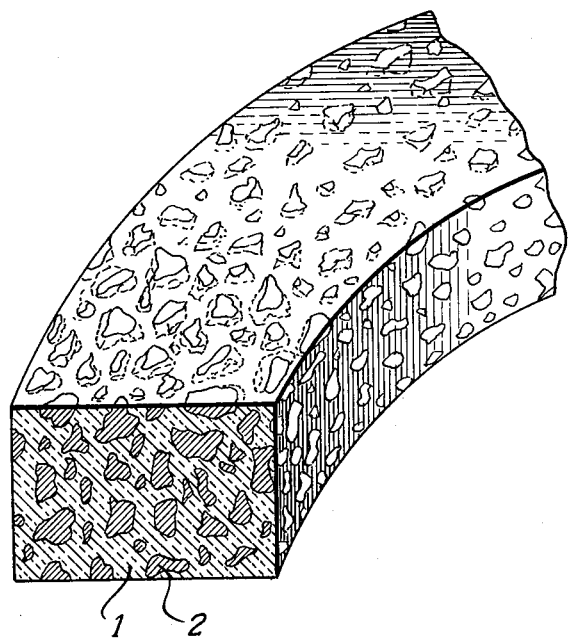
INVENTOR.
RENE'STRUB.
BY
ATTORNEY.

United States Patent Office 3,067,135
Patented Dec. 4, 1962

3,067,135
BEARING COMPRISING POLYTETRAFLUORO-
ETHYLENE AND PHOSPHATE GLASS
René Strub, Winterthur, Switzerland, assignor to Sulzer
Freres, S.A., Winterthur, Switzerland, a corporation of
Switzerland
Filed Feb. 29, 1960, Ser. No. 11,658
Claims priority, application Switzerland Mar. 4, 1959
1 Claim. (Cl. 252—12)

The invention relates to a gliding element made of Teflon mixed with glass and having a surface gliding, without lubrication, on a surface of another element, as in bearings and in mechanical packings having relatively moving sealing surfaces.

It has been found of advantage for several reasons to make the unlubricated gliding surface portion of at least one of two relatively movable parts of a polymerization product of tetrafluoroethylene known in the trade as Teflon. This material has a very low frictional resistance due to its wax or soaplike consistency and, under certain circumstances, is self-lubricating. It is conventional to mix glass in the form of fibres with synthetic materials for reinforcing the latter. Extensive tests have shown that this does not increase resistance to wear, particularly of surface portions which glide at great relative speed on surfaces of other elements.

According to the invention glass is admixed to Teflon in the form of lumps, i.e. in the form of pieces of glass whose extension in one direction is not substantially different from the extension which is normal to the first extension or whose smallest dimension is not substantially different from their greatest dimension.

Phosphate glass lumps are preferably admixed to Teflon, if the material is used for mechanical packings, for example, for high speed compressors in plants for separating isotopes which plants are used for separating uranium 235 and uranium 238 from uranium hexafluoride. This mixture has been found to satisfactorily resist the aggressiveness of the uranium hexafluoride.

It has been proven by extensive tests that admixture to Teflon of glass pieces in lump form as defined above substantially increases the resistance of the surface of the Teflon element against abrasion, which surface slides on a surface of another element, so that there is no noticeable wear. The lubricating effect of the Teflon is not substantially affected by the admixture of the glass lumps.

Other characteristic features of the invention will be found in the following example and description of an embodiment when read in connection with the accompanying drawing, the single FIGURE of which is a perspective view on a much enlarged scale of a portion of a packing ring made according to the invention.

Pieces or lumps of irregular contour of phosphate glass have been admixed to a mass of liquid Teflon whereby the glass amounted to about 25% by weight of the total mass. The largest dimension of the glass lumps was not more than a few tenths of a millimeter and the pieces were distributed in the Teflon mass as homogeneously as possible. The mixture was allowed to solidify whereupon the desired articles were made from the material.

The single FIGURE of the drawing illustrates a portion of a packing ring made of Teflon 1 in which lumps 2 of phosphate glass are embedded and homogeneously distributed. The phosphate glass pieces have an irregular contour and their largest diameter amounts to a few tenths of a millimeter, the smallest dimension of a millimeter, the smallest dimension of the predominant number of the embedded glass pieces is at least about one tenth of a millimeter.

The invention is not limited to the particular shapes of the individual glass pieces shown and to the concentration of the pieces of the Teflon.

I claim:

A machine bearing element adapted to be employed as a packing and as a bearing in frictional contact with a surface rotating at high speed comprising a shaped polytetrafluoroethylene material having granular particles of phosphate glass embedded therein and uniformly dispersed throughout said polytetrafluoroethylene material, the combination of said phosphate glass particles in the polytetrafluoroethylene matrix forming said shaped machine element.

References Cited in the file of this patent

UNITED STATES PATENTS

| | | |
|---|---|---|
| 2,400,009 | Brubaker et al. | May 19, 1946 |
| 2,744,988 | Tierman | May 8, 1956 |
| 2,782,179 | Loutz | Feb. 19, 1957 |
| 2,824,060 | White | Feb. 18, 1958 |
| 2,891,921 | Kumnick et al. | June 23, 1959 |
| 2,920,972 | Godron | Jan. 12, 1960 |

FOREIGN PATENTS

| | | |
|---|---|---|
| 502,040 | Canada | May 4, 1954 |